United States Patent [19]
Lossie

[11] 3,788,676
[45] Jan. 29, 1974

[54] FLEXIBLE HOSE CONNECTOR
[76] Inventor: Robert A. Lossie, 2445 N. Dunlap Street, St. Paul, Minn. 55113
[22] Filed: Jan. 31, 1972
[21] Appl. No.: 221,968

[52] U.S. Cl. ............................... 285/247, 285/397
[51] Int. Cl. ............................................. F16l 33/22
[58] Field of Search ... 285/247, 251, 397, 242, 245, 285/255, 174, 398, 257

[56] References Cited
UNITED STATES PATENTS
| 48,709 | 7/1865 | Emery | 285/251 |
| 3,032,358 | 5/1962 | Rolston | 285/247 |
| 1,271,597 | 7/1918 | Mazade | 285/251 X |
| 578,983 | 3/1897 | Green | 285/245 |
| 1,233,401 | 7/1917 | Reeve | 285/247 |

FOREIGN PATENTS OR APPLICATIONS
582,877   1/1958   Italy ................................. 285/247

Primary Examiner—Thomas F. Callaghan
Attorney, Agent, or Firm—Howard I. Podell

[57] ABSTRACT

A coupler unit for connecting two flexible hoses in a watertight joint. The unit consists of a short length of tubing with a special male thread on each end, together with two loose captive female threaded members. The hose to be coupled is forced over a male threaded end of the tubing, and the female threaded member is rotated over the outer periphery of the hose, forcing the coupled hose into a threaded engagement with both the connector, and the female threaded member.

1 Claim, 4 Drawing Figures

PATENTED JAN 29 1974 3,788,676

FLEXIBLE HOSE CONNECTOR

SUMMARY OF THE DISCLOSURE

The object of this invention is a coupler for forming watertight connections between lengths of flexible hose, and particularly to the garden type of hose.

The connector is particularly suited for coupling plastic hose. The plastic type of hose presents difficulty in coupling using the conventional type of devices, because of the reduced wall thickness of such hose, the reduced surface friction of the plastic, and the manner in which such plastic material creeps under pressure to result in a loose joint in compression couplers of conventional design.

In my invention, the coupler unit consists of a short length of tubing formed at each end with special male threads adaptable to being forced into the bore of each hose to be coupled. A captive female threaded unit on each end of the coupler is then threaded over the periphery of the hose to effect a tight engagement of the hose to the coupler.

The special thread form of both the male and the female threaded members is of the same pitch, with the pitch diameter of the female thread form, being oversize the pitch diameter of the male thread form. The cross-section of the roots and crests of the thread form are rounded, with the longititudinal cross-section of the thread form being of sinusoidal character.

BRIEF DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
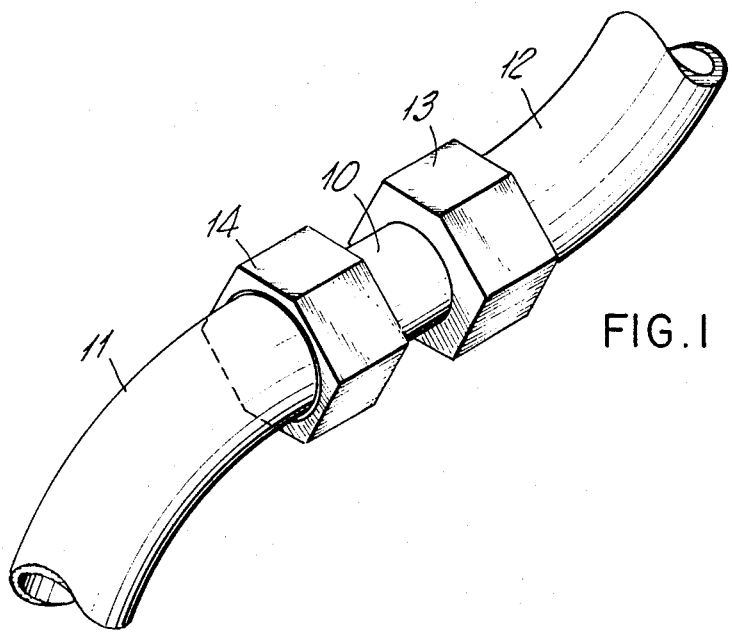
FIG. 1 is a perspective view of the invention coupling two sections of hose.

Turning now descriptively to the drawing, in which similar reference characters denote similar elements throughout the several views, FIG. 1 illustrates the coupler 10 joining hose sections 11 and 12.

Figure 2:
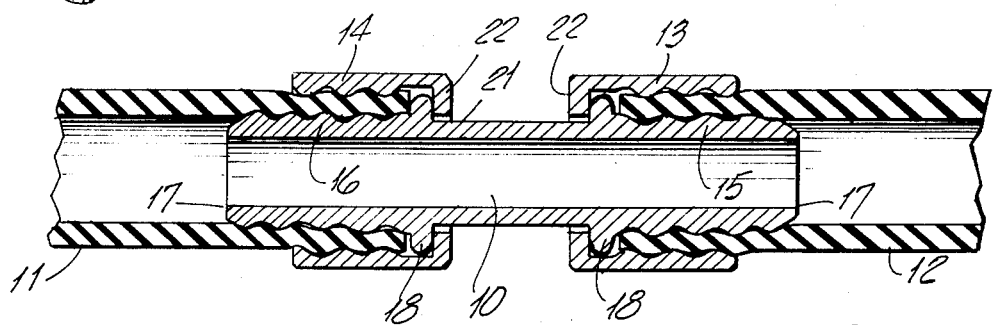
FIG. 2 is a longitudinal cross-section view of the coupled joint of FIG. 1.
Figure 3:
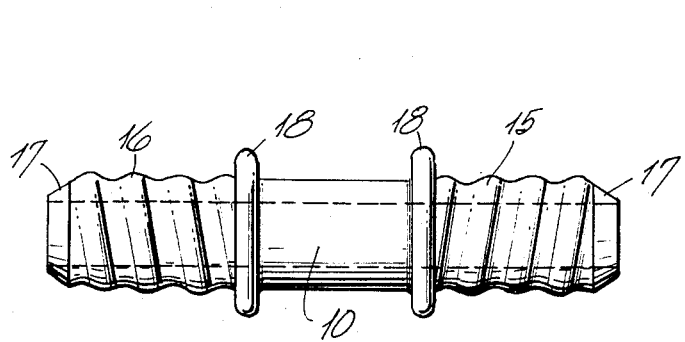
FIG. 3 is a plan view of the core member of the coupler.
Figure 4:
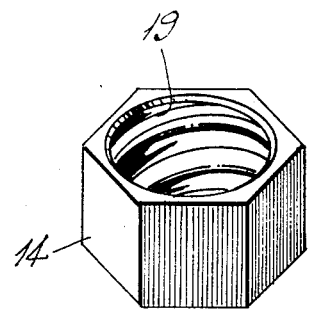
FIG. 4 is an isometric view of one of the female threaded members.

As shown in FIG. 2, and FIG. 3, each end 17 of the coupler 10 is tapered so as to fit readily inside hose connections 11 and 12. The male thread of each end 15 and 16 of coupler 10 forces hoses 12 and 11 into threaded engagement with the coupler 10 when female threaded collar nuts 13 and 14 are rotated over the outside of the joined sections of hose.

A flanged lip 18 adjoining each male threaded end holds collar nuts 13 and 14 captive on the coupler unit 10. Flanged lip 18 may be formed on the tubing section after collar nuts 13 and 14 are installed on the coupler unit 10, or alternately threaded nuts may be installed on the coupler shank 21 after flanged lip 18 has been formed, with the collar section 22 of the collar nuts 13 and 14 then swaged so as to reduce the diameter of the opening of the collar section 22 to less than the diameter of the flanged lips 18. The preferred embodiment of the coupler unit 10 is fabricated with a right hand thread 16 one at one one end and a left hand thread 15 at the other end so that the coupler may be rotated in a given direction when fastening to both hose assemblies 11 and 12. However, both ends of the coupler unit may have right hand male threads, mating in pitch with right hand female threads 19 in the collar nuts 13 and 14. The pitch diameter of female thread 19 is oversize the pitch diameter of male thread 16.

Since obvious changes may be made in the specific embodiment of the invention described herein without departing from the scope thereof, it is indicated that all matter contained herein is intended to be interpreted in an illustrative and not a limiting sense.

Having thus described my invention what I claim as new and desire to secure by Letters Patent of the United States is:

1. A coupler unit for joining two sections of flexible hose in a watertight joint comprising a length of tubing with tapered ends, with a straight male thread formed externally on each end, together with two collar nuts rotatably fitted over the tubing and having straight female threads, the female thread form of the collar nuts being of the same pitch as the male thread of the coupler unit, but said female threads being oversize in pitch diameter to the pitch diameter of the said male threads so as to form a watertight connection between two sections of flexible hose when each male thread of the coupler unit is forced into the bore of a section of the flexible hose, and the female thread of each collar nut is rotated over the outside of the end of each attached hose section so as to swage each said hose end between the said male and female threads, in which the crests and the roots of both male and female threads are rounded so that the longitudinal cross-section of said thread form is of sinusoidal nature, with the two collar nuts retained in captive fashion on the coupler unit, by means of continuous flanged lips adjoining the inside ends of both male thread sections, said flanged lips being of larger diameter than the continuous collar opening in each said collar nut.

* * * * *